US012424027B2

(12) United States Patent
Yang et al.

(10) Patent No.: US 12,424,027 B2
(45) Date of Patent: Sep. 23, 2025

(54) JOINT MOTION ESTIMATION BASED METHOD FOR ESTIMATING CONTINUOUS HUMAN POSTURES

(71) Applicant: ZHEJIANG UNIVERSITY, Hangzhou (CN)

(72) Inventors: Canjun Yang, Hangzhou (CN); Xin Wu, Hangzhou (CN); Zhangpeng Tu, Hangzhou (CN); Weitao Wu, Hangzhou (CN); Yuanchao Zhu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 344 days.

(21) Appl. No.: 18/134,547

(22) Filed: Apr. 13, 2023

(65) Prior Publication Data

US 2023/0343140 A1 Oct. 26, 2023

(30) Foreign Application Priority Data

Apr. 20, 2022 (CN) .......................... 202210418358.0

(51) Int. Cl.
*G06V 40/20* (2022.01)
*G06T 7/20* (2017.01)
*G06V 10/75* (2022.01)

(52) U.S. Cl.
CPC ............... *G06V 40/20* (2022.01); *G06T 7/20* (2013.01); *G06V 10/751* (2022.01); *G06T 2207/10016* (2013.01)

(58) Field of Classification Search
None
See application file for complete search history.

(56) References Cited

U.S. PATENT DOCUMENTS

2018/0253906 A1\* 9/2018 Tran ..................... G06V 10/143
2021/0084309 A1\* 3/2021 Zhao .................... H04N 19/186

FOREIGN PATENT DOCUMENTS

CN 109919122 6/2019
CN 110197123 9/2019
(Continued)

OTHER PUBLICATIONS

Keep it SMPL: Automatic Estimation of 3D Human Pose and Shape from a Single Image. Bogo et al. (Year: 2016).\*
(Continued)

*Primary Examiner* — Delomia L Gilliard
(74) *Attorney, Agent, or Firm* — Jiwen Chen; Joywin IP Law PLLC

(57) ABSTRACT

The present invention discloses a key joint motion estimation based method for estimating continuous human postures. A motion estimation block matching algorithm is applied to human key joint tracking, so as to obtain continuous human posture results. Meanwhile, the results are continuously corrected by using a deep neural network based human posture estimator. The present invention may estimate the continuous human postures in a video stream, where the human postures are specifically embodied as coordinate positions of human joints in a video frame. Compared with a posture estimation method completely relying on a deep neural network, the posture estimation method provided by the present invention has the advantages of high frame rate, low hardware requirements, and sequential continuity of recognition results; and compared with a posture estimation method completely relying on a motion estimation algorithm, the present invention may correct a cumulative error, to improve the estimation accuracy.

10 Claims, 5 Drawing Sheets

(56) References Cited

FOREIGN PATENT DOCUMENTS

| CN | 110334607 | 10/2019 |
|----|-----------|---------|
| CN | 110638461 | 1/2020  |
| CN | 112686097 | 4/2021  |

OTHER PUBLICATIONS

End-to-end Recovery of Human Shape and Pose. Kanazawa et al. (Year: 2017).*
HuMoR: 3D Human Motion Model for Robust Pose Estimation. Rempe et al. (Year: 2021).*
Spatio-Temporal Matching for Human Pose Estimation in Video. Zhou et al. (Year: 2015).*

* cited by examiner

JOINT MOTION ESTIMATION BASED METHOD FOR ESTIMATING CONTINUOUS HUMAN POSTURES

This application claims priority of Chinese Application No. 202210418358.0, filed Apr. 20, 2022, which is hereby incorporated by reference.

FIELD OF TECHNOLOGY

The present invention relates to the technical field of video image processing, in particular to a key joint motion estimation based method for estimating continuous human postures.

BACKGROUND TECHNOLOGY

In recent years, the estimation of human postures in an image/a video is generally implemented by using a deep neural network. However, the deep neural network has higher requirements for computer hardware and larger consumption of computing resources. Although calculated results have higher accuracy, the calculation is slower and poorer in real-timeliness. These defects limit the application of human posture estimation and make it more difficult to popularize. In addition, the estimation of the human postures in the video by using the deep neural network is to, in essence, divide the video into frames of images for calculation, without use of prior knowledge that human posture information between the frames of images in the video is continuous, so that the information of each frame is independent and separate, and the jump easily occurs.

A solution for extracting human postures based on the above deep neural network has the following references:

(1) In the invention patent application No. CN110334607B, entitled "a method and system for recognizing a human interaction behavior in a video", pedestrian detection is performed using a YOLOv3 network. The YOLOv3 network is a convolutional neural network.

(2) In the invention patent application No. CN112686097A, entitled "a method for estimating a posture of a joint in a human body image", a deep neural network model capable of estimating the posture in the human body image to obtain a human joint image is obtained through training.

(3) In the invention patent application No. CN110638461A, entitled "a method and system for recognizing a human posture on an electric sickbed", the human posture is recognized using a Stacked Hourglass algorithm. Stacked Hourglass is a deep neural network.

(4) In the invention patent application No. CN110197123A, entitled "a Mask R-CNN based method for recognizing a human posture", posture features are extracted using a Mask R-CNN. The Mask R-CNN is a deep neural network.

(5) In the invention patent application No. CN109919122A, entitled "a 3D human joint based method for detecting a temporal action", a target boundary frame of a person is extracted using a multi-layer CNN, coordinates of 2D joints are obtained through body positioning and correlation degree analysis, and then a joint regression network is constructed, to implement the mapping from the 2D joints to 3D joints. Both the CNN and the joint regression network are deep neural networks.

In the broad fields of image processing and video encoding, there are H.264, H.265 and other industry-recognized encoding standards and protocols. In these standards, the ultimate goal of motion estimation is to implement the compression of continuous image frames in a video by dividing a whole image into many small regions (macroblocks) and then searching for and estimating the most similar regions of these macroblocks. The above motion estimation algorithm based on block matching is called a block matching algorithm.

SUMMARY OF THE INVENTION

In view of the above deficiencies in the prior art that human postures are estimated with a deep neural network, the present invention provides a continuous human posture estimation algorithm integrating a deep neural network human posture estimation algorithm and a block matching motion estimation algorithm. The provided algorithm may give full play to the advantages of the two technical routes, avoid and supplement their disadvantages, and implement fast and accurate continuous human posture estimation.

There is provided a key joint motion estimation based method for estimating continuous human postures. A system for estimation includes two estimators:

an estimator 1 that is a pretrained deep neural network posture estimator, and an estimator 2 that is a video encoding standard H.264 based motion estimator.

The key joint motion estimation based method for estimating continuous human postures includes three stages:

A first stage: after the system starts to operate, taking a first imported video frame as a key frame $I_0$, recognizing a human posture in the video frame by using the estimator 1, so as to obtain initial human key joint coordinates; during operation of the estimator 1, enabling the system to continue to acquire a plurality of video frames, and temporarily storing the video frames in a computer memory queue; and after the operation of the estimator 1, transmitting obtained key joint coordinate data and all the temporarily stored video frames into the estimator 2 for operation in order, to obtain a human key joint estimation result of each video frame;

a second stage: operating a next video frame $I_1$ subsequently acquired by the system after the operation of the estimator 1 in the first stage by using both the estimator 1 and the estimator 2, and performing real-time operation on a subsequently acquired new video frame by using the estimator 2 in a process that the operation of the estimator 1 is not completed yet; and a third stage: after the operation of the estimator 1 in the second stage, comparing estimation results of key joints in the video frame $I_1$ by the estimator 1 and the estimator 2, and if a sum of all key joint coordinate errors of the two estimators is less than a set threshold ε, repeating the steps in the second stage for subsequent video frames; and if an error between the two estimators is greater than the threshold, updating, based on the estimation results of the key joints in the video frame $I_1$ by the estimator 1, the estimation results of the key joints in the video frame obtained by the estimator 2 during the operation of the estimator 1 by using the estimator 2 again, and after these results are updated, repeating the steps in the second stage for the subsequent video frames.

The set threshold ε in the third stage may be set as required, and there is no unified standard.

Preferably, the estimator 1 uses a VNect, DeepPose, Stacked Hourglass or RMPE neural network model trained by an MPI-INF-3DHP data set.

Preferably, an algorithm in the estimator 2 is an algorithm for detecting coordinate changes of the key joints by using a block matching algorithm; in the block matching algorithm, it is required to search for a block most similar to a macroblock to be matched in a previous frame based on a given matching criterion in a current frame; the macroblock is a small rectangular region centered on a selected key joint; a range of block matching is called a search window, that is a larger rectangular region centered on the selected key joint; and a macroblock having a minimum error with the macroblock to be matched in the search window serves as a matching result.

More preferably, the matching criterion in the block matching algorithm uses a minimum mean square error (MSE) function, a minimum mean absolute deviation (MAD), or a minimum sum of absolute difference (SAD) criterion, defined as follows:

$$MSE = \frac{1}{\sum_p} \sum_{p \in B} \left| f(p+v) - f_{last}(p) \right|^2$$

$$MAD = \frac{1}{\sum_p} \sum_{p \in B} \left| f(p+v) - f_{last}(p) \right|$$

$$SAD = \sum_{p \in B} | f(p+v) - f_{last}(p) |$$

wherein p represents a pixel in the macroblock to be matched B, v represents a motion vector corresponding to two macroblocks that are being matched, f(a) represents a pixel value at a position a in the current video frame, and $f_{last}$(a) represents a pixel value at a position a in the previous video frame, that is, if f(p+v) represents a pixel value at a position p+v in the current video frame, $f_{last}$(p) represents a pixel value at a position p in the previous video frame.

More preferably, after the matching criterion is determined, it is also required to match an actual macroblock; and when the block matching algorithm selects the macroblock to be matched in the current frame, a macroblock to be selected is selectively determined by using a search template. Further preferably, when the macroblock to be selected is selectively determined by using the search template, a motion estimation search algorithm used is a three-step search method, a diamond search method, or a four-step search method.

Further preferably, the three-step search method includes the following steps:

step one: setting a larger region in the video frame that completely contains the macroblock as the search window, where a center of the macroblock is a center point of the search window; with the center point as a starting point of search, searching for step lengths from a range of equal to or slightly greater than half of a radius of the search window; and in the search of each step length, calculating matching indexes of a total of nine points comprising a center point of a current square and eight points around, and selecting a point with an optimal index as a center point of a next search;

step two: with the point obtained in the previous step as a center, reducing a currently searched step length to half of a previously searched step length, then performing a similar search, and obtaining an optimal matching point; and step three: continuing reducing the searched step length to half of the previous one, and performing a search to find an optimal matching position.

Further preferably, the diamond search method has two different matching templates of a big diamond and a small diamond; the big diamond has nine search points, and the small diamond has only five search points; firstly, a coarse search is performed by using the big diamond search template with a larger step length, and then a fine search is performed by using the small diamond template; and the diamond search method includes the following steps:

step one: with a diamond as a template, calculating matching indexes of a total of nine points comprising a center point and eight points around, and performing comparison to obtain a point with an optimal index;

step two: if the center point of search is the point with the optimal index, skipping to step three to use the small diamond search template, otherwise returning to the search in the step one; and step three: calculating, by using the small diamond search template with the only five search points, matching indexes of the five points, and taking a point with an optimal index as an optimal matching point.

Further preferably, the four-step search method includes the following steps:

step one: enabling an initial setting to be the same as that in the three-step search method, calculating matching indexes of nine selected points centered on a key joint, and if a point with an optimal index is a center point, skipping to step four, otherwise proceeding to step two;

step two: with a pixel searched in the previous step as the center point, keeping an interval of selected points unchanged, continuing to calculate the matching indexes of the newly obtained nine points, and if the center point is the point with the optimal index, skipping to step four, otherwise proceeding to step three;

step three: if the searched center point reaches an edge of the search window, necessarily reducing the interval of the selected points to 3×3, and proceeding to step four, otherwise repeating the step two; and step four: reducing the interval of the selected points to 3×3, and performing a search, to obtain an optimal matching point.

Preferably, during definition of human key joints, a total of 21 key joints are defined as follows:

| index | key joint |
| --- | --- |
| 0 | head_top |
| 1 | neck |
| 2 | right_shoulder |
| 3 | right_elbow |
| 4 | right_wrist |
| 5 | left_shoulder |
| 6 | left_elbow |
| 7 | left_wrist |
| 8 | right_hip |
| 9 | right_knee |
| 10 | right_ankle |
| 11 | left_hip |
| 12 | left knee |
| 13 | left_ankle |
| 14 | pelvis |
| 15 | spine |
| 16 | head |

-continued

| index | key joint |
|---|---|
| 17 | right_hand |
| 18 | left hand |
| 19 | right_toe |
| 20 | left_toe. |

According to a basic idea of the present invention, a motion estimation block matching algorithm is applied to human joint tracking, so as to obtain continuous human posture results. Meanwhile, the results are continuously corrected by using a deep neural network based human posture estimator. For the human key joint tracking, it is only required to divide a corresponding number of macroblocks with a selected key joint to be tracked as a center, without dividing a whole image into a plurality of macroblocks as in image compression, and then to search for, by searching for changes of macroblocks in two adjacent image frames, an optimal motion estimation result of the macroblocks according to a specific strategy.

The present invention may estimate the continuous human postures in a video stream, where the human postures are specifically embodied as coordinate positions of human key joints in a video frame. Compared with a posture estimation method completely relying on a deep neural network, the posture estimation method provided by the present invention has the advantages of high frame rate, low hardware requirements, and sequential continuity of recognition results; and compared with a posture estimation method completely relying on a motion estimation algorithm, the present invention may correct a cumulative error, to improve the estimation accuracy.

The video stream processed in the technical solution of the present application may be a read video stored in a hard disk or a real-time video acquired by a camera, and when the real-time video acquired by the camera is processed, the advantages of the present invention can be better highlighted due to higher requirements for real-timeliness.

DETAILED DESCRIPTION OF THE EMBODIMENTS

Figure 1:
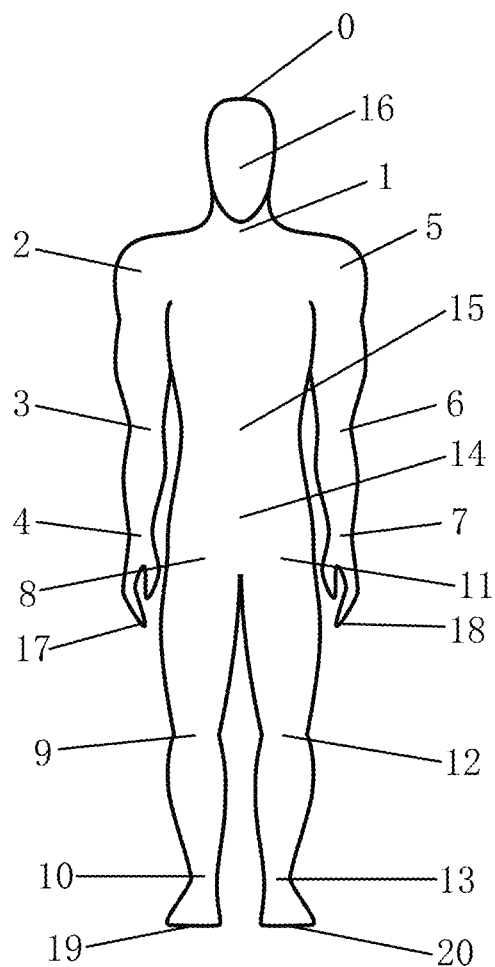
FIG. 1 is a schematic position diagram of human key joints in the present invention.

Human joints tracked in the embodiment are defined below. A total of 21 key joints are defined. Names and numbers of all the key joints are as shown in FIG. 1. Positions of all the key joints are as shown in FIG. 1.

TABLE 1

| index | key joint |
|---|---|
| 0 | head _top |
| 1 | neck |
| 2 | right_shoulder |
| 3 | right_elbow |
| 4 | right_wrist |
| 5 | left_shoulder |
| 6 | left_elbow |
| 7 | left_wrist |
| 8 | right_hip |
| 9 | right_knee |
| 10 | right_ankle |
| 11 | left_hip |
| 12 | left knee |
| 13 | left_ankle |
| 14 | pelvis |
| 15 | spine |
| 16 | head |
| 17 | right_hand |
| 18 | left_hand |
| 19 | right_toe |
| 20 | left toe |

Figure 2A:
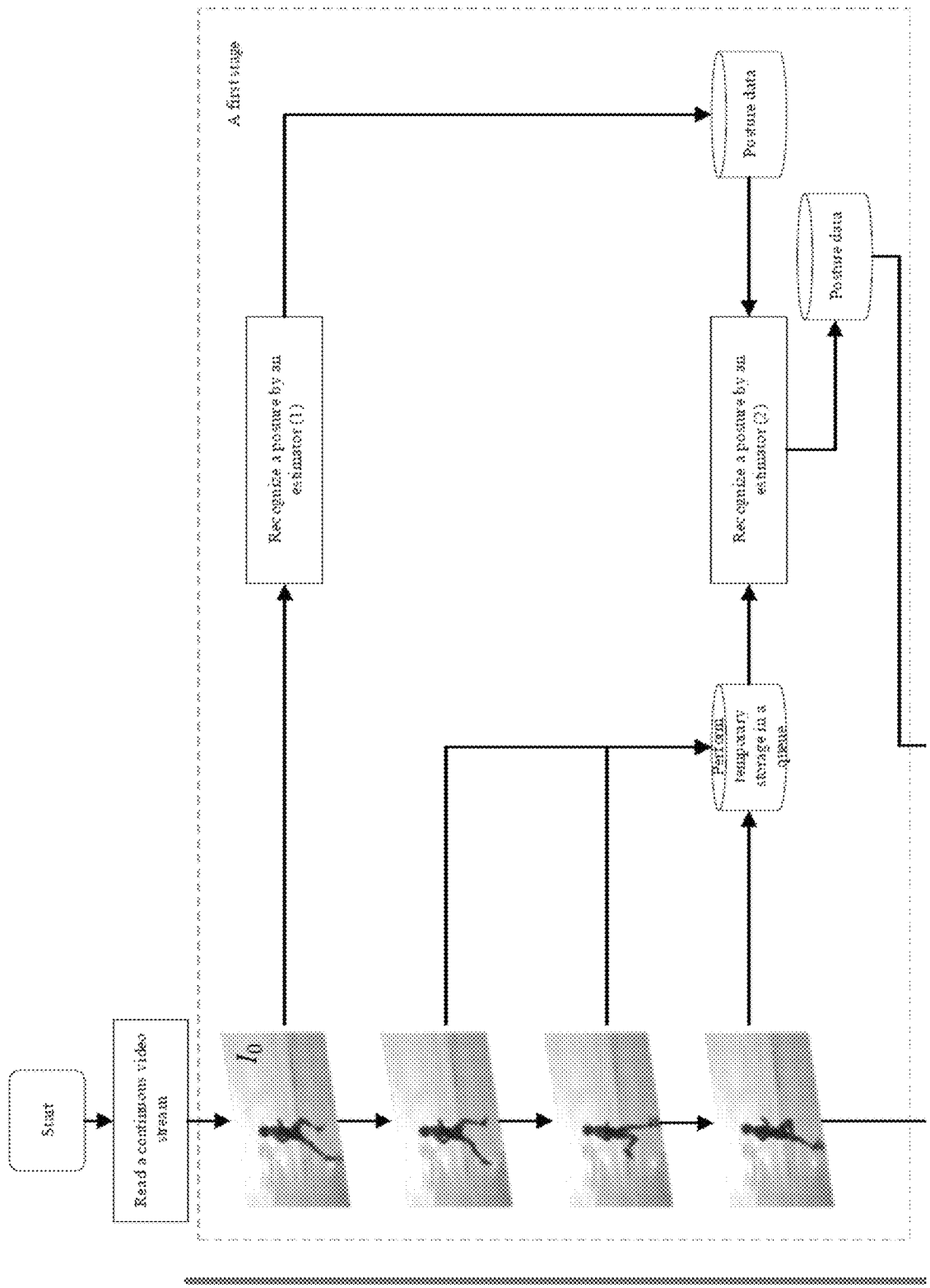
FIG. 2(a) and FIG. 2(b) are a flowchart of a key joint motion estimation based method for estimating continuous human postures in the present invention.
Figure 2B:
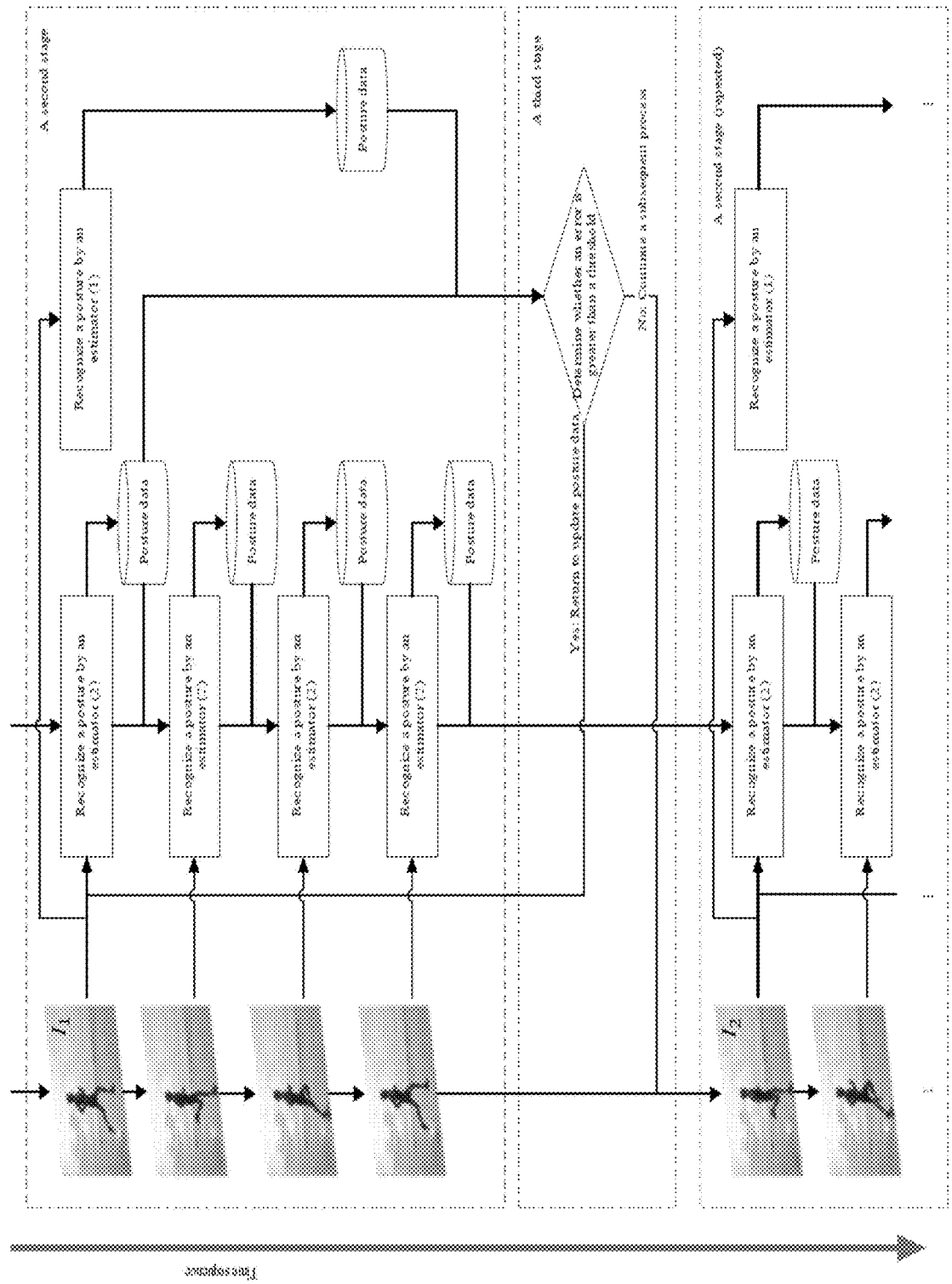

A flowchart of a key joint motion estimation based method for estimating continuous human postures in the present invention is as shown in FIG. 2.

A core part of an algorithm includes two modules, which are a pretrained deep neural network posture estimator, namely an estimator (1), and a video encoding standard H.264 based motion estimator, namely an estimator (2), respectively.

For the estimator (1), a VNect neural network model trained by an MPI-INF-3DHP data set is used in the embodiment (other feasible network models include DeepPose, Stacked Hourglass, RMPE, etc.). The estimator (1) has a frame rate of about 30 Hz and an average coordinate error of 82.5 mm in an environment of Intel Core i5-8400 CPU and NVIDIA GeForce GTX 1060 6 GB GPU.

For the estimator (2), the estimator (2) is an algorithm for detecting coordinate changes of key joints by using a block matching algorithm.

Figure 3:
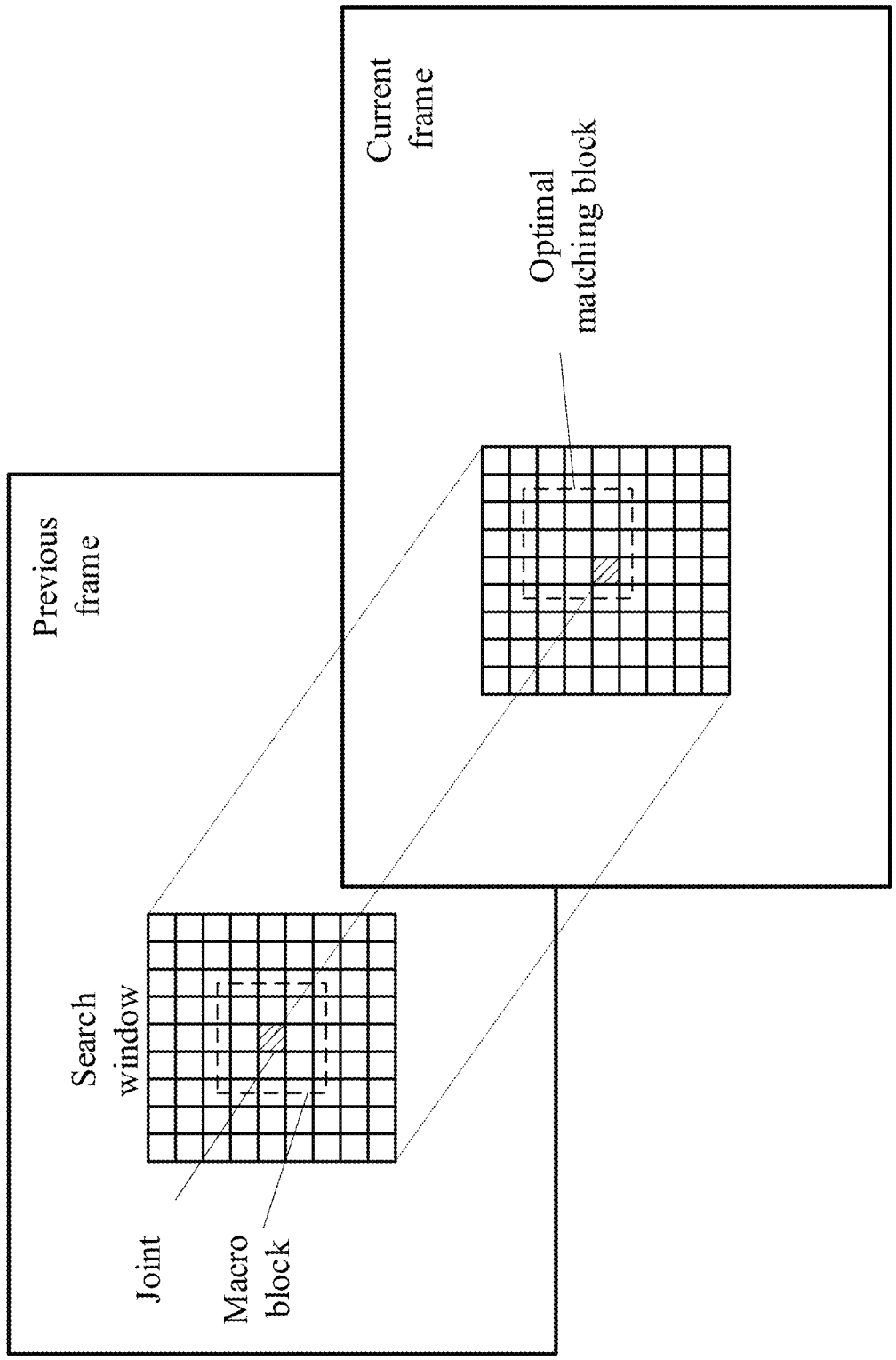
FIG. 3 is a schematic diagram of a motion estimation block matching algorithm.

For the block matching algorithm, as shown in FIG. 3, in the block matching algorithm, it is required to search for a block most similar to a macroblock to be matched in a previous frame based on a given matching criterion in a current frame. A macroblock is a small rectangular region centered on a selected key joint. A range of block matching is called a search window, that is a larger rectangular region centered on the selected key joint. A macroblock having a minimum error with the macroblock to be matched in the search window serves as a matching result.

The matching criterion frequently used in the block matching algorithm includes a minimum mean square error (MSE) function, a minimum mean absolute deviation (MAD), and a minimum sum of absolute difference (SAD) criterion, defined as follows:

$$MSE = \frac{1}{\sum_p} \sum_{p \in B} \left| f(p+v) - f_{last}(p) \right|^2$$

$$MAD = \frac{1}{\sum_p} \sum_{p \in B} \left| f(p+v) - f_{last}(p) \right|$$

$$SAD = \sum_{p \in B} \left| f(p+v) - f_{last}(p) \right|$$

where p represents a pixel in the macroblock to be matched B, v represents a motion vector (a relative position) corresponding to two macroblocks that are being matched, f(a) represents a pixel value at a position a in the current video frame, and $f_{last}(a)$ represents a pixel value at a position a in the previous video frame. In the above matching criteria, the SAD criterion is most widely used.

Figure 4:
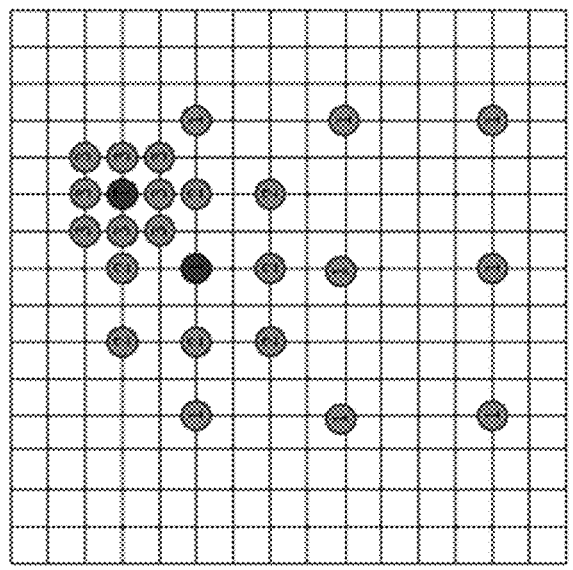
FIG. 4 shows schematic diagrams of three classical motion estimation algorithms, including (a) three-step search, (b) four-step search, and (c) diamond search.
Figure 4:
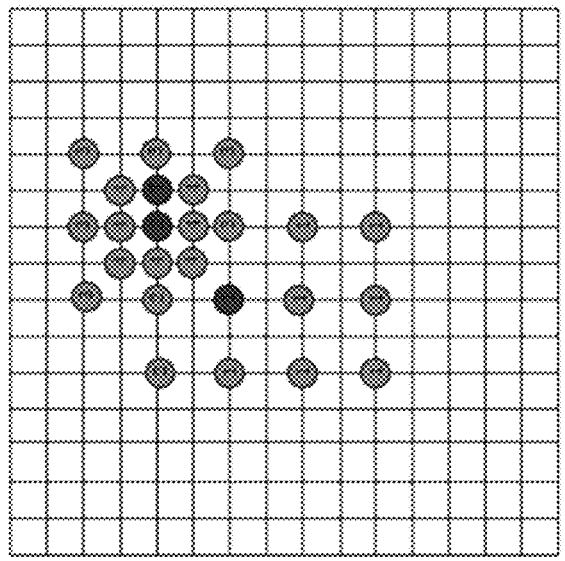
Figure 4:
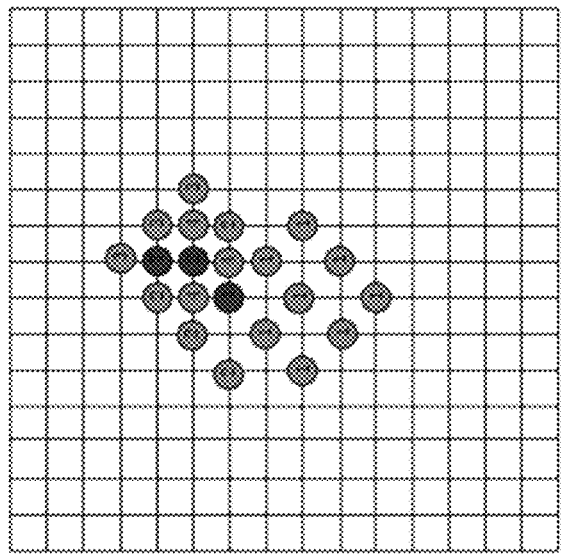

After the matching criterion is determined, it is also required to match an actual macroblock. When the block matching algorithm selects the macroblock to be matched in the current frame, if all macroblocks in the region are matched in sequence, a global optimal matching macroblock in the region may be found eventually. However, such method is too large in calculation amount to meet lightweight requirements, and is rarely used in the field of video encoding. In contrast, a plurality of search templates may be used to selectively determine a macroblock to be selected. More classical motion estimation search algorithms include a three-step search method, a diamond search method, and a four-step search method. FIG. 4 (figure is quoted from: Yang Xiaoyu, "Optimization of motion estimation algorithm based on HEVC," master, Nanjing University of Posts and Telecommunications, 2018.) shows schematic diagrams of three classical motion estimation algorithms, including (a) three-step search, (b) four-step search, and (c) diamond search.

The three-step search method includes the following steps:
step one: setting a larger region in an image that completely contains the macroblock as the search window, where a center (that is a position of a key joint) of the macroblock is a center point of the search window; with the center point as a starting point of search, searching for step lengths (that is a center distance between selected macroblocks to be matched) from a range of equal to or slightly greater than half of a radius of the search window; and in the search of each step length, calculating matching indexes (such as SAD) of a total of nine points including a center point of a current square and eight points around, and selecting a point with an optimal index (such as a minimum SAD) as a center point of a next search;
step two: with the point obtained in the previous step as a center, reducing a currently searched step length to half of a previously searched step length, then performing a similar search, and obtaining an optimal matching point; and step three: continuing reducing the searched step length to half of the previous one, and performing a search to find an optimal matching position.

The four-step search method includes the following steps:
step one: enabling an initial setting to be the same as that in the three-step search method, calculating matching indexes of nine selected points centered on a key joint, and if a point with an optimal index is a center point, skipping to step four, otherwise proceeding to step two;
step two: with a pixel searched in the previous step as the center point, keeping an interval of selected points unchanged, continuing to calculate the matching indexes of the newly obtained nine points, and if the center point is the point with the optimal index, skipping to step four, otherwise proceeding to step three;
step three: if the searched center point reaches an edge of the search window, necessarily reducing the interval of the selected points to 3×3, and proceeding to step four, otherwise repeating the step two; and
step four: reducing the interval of the selected points to 3×3, and performing a search, to obtain an optimal matching point.

The diamond search has two different matching templates of a big diamond and a small diamond, where the big diamond has nine search points, and the small diamond has only five search points. Firstly, a coarse search is performed by using the big diamond search template with a larger step length, and then a fine search is performed by using the small diamond template. The diamond search method includes the following steps:
step one: with a diamond as a template, calculating matching indexes of a total of nine points including a center point and eight points around, and performing comparison to obtain a point with an optimal index;
step two: if the center point of search is the point with the optimal index, skipping to step three to use the small diamond search template, otherwise returning to the search in the step one; and
step three: calculating, by using the small diamond search template with the only five search points, matching indexes of the five points, and taking a point with an optimal index as an optimal matching point.

The three-step search method based on the minimum sum of absolute difference criterion is preferred in the embodiment of the present application.

The estimator (2) is simple and fast in calculation, and has a frame rate of about 50,000 Hz in the environment of Intel Core i5-8400 CPU and NVIDIA GeForce GTX 1060 6 GB GPU, which is far beyond the frame rate requirements of real-time processing of video streams. However, the estimator may drift seriously over time to gradually deviate from and lose a tracking target.

The video stream processed may be a video stored in a storage device that is read by frame, or a real-time video acquired by a camera (in this case, the requirements for real-timeliness is higher, so that the advantages of the present invention can be better highlighted).

An algorithm flow includes the following three stages:
The First Stage:
After a program starts to operate, taking a first imported video frame as a key frame $I_0$, recognizing a human posture in the video frame by using the estimator (1), so as to obtain initial human key joint coordinates. The estimator (1) takes a longer time for operation, and during the process, a system continues to acquire a plurality of video frames and temporarily stores the video frames in a computer memory queue. After the operation of the estimator (1), obtained key joint coordinate data and all the temporarily stored video frames are transmitted into the estimator (2) for operation in order, to obtain a human key joint estimation result of each video frame. The estimator (2) takes a short time for operation and may be considered to complete the operation in real time.
The Second Stage:
Operating a next video frame $I_1$ subsequently acquired by the system after the operation of the above estimator (1) by using both the estimator (1) and the estimator (2), and performing real-time operation on a subsequently acquired new video frame by using the estimator (2) in a process that the operation of the estimator (1) is not completed yet.
The Third Stage:
After the operation of the estimator (1) in the second stage, comparing estimation results of key joints in the video frame $I_1$ by the estimator (1) and the estimator (2), and if a sum of all key joint coordinate errors of the two estimators is less than a set threshold ε, repeating the steps in the second stage for subsequent video frames; and if an error between the two estimators is greater than the threshold, updating, based on the estimation results of the key joints in the video frame $I_1$ by the estimator (1), the estimation results of the key joints in the video frame obtained by the estimator (2) during the operation of the estimator (1) by using the estimator (2) again, and after these results are updated, repeating the steps in the second stage for the subsequent video frames. Similarly, the estimator (2) takes a short time for operation and may be considered to complete the operation in real time.

The invention claimed is:

1. A key joint motion estimation based method for estimating continuous human postures, wherein a system for estimation comprises two estimators:
   an estimator 1 that is a pretrained deep neural network posture estimator, and
   an estimator 2 that is a video encoding standard H.264 based motion estimator; and
   the key joint motion estimation based method for estimating continuous human postures comprises three stages:
   a first stage: after the system starts to operate, taking a first imported video frame as a key frame $I_0$, recognizing a human posture in the video frame by using the estimator 1, so as to obtain initial human key joint coordinates; during operation of the estimator 1, enabling the system to continue to acquire a plurality of video frames, and temporarily storing the video frames in a computer memory queue; and after the operation of the estimator 1, transmitting obtained key joint coordinate data and all the temporarily stored video frames into the estimator 2 for operation in order, to obtain a human key joint estimation result of each video frame;
   a second stage: operating a next video frame $I_1$ subsequently acquired by the system after the operation of the estimator 1 in the first stage by using both the estimator 1 and the estimator 2, and performing real-time operation on a subsequently acquired new video frame by using the estimator 2 in a process that the operation of the estimator 1 is not completed yet; and
   a third stage: after the operation of the estimator 1 in the second stage, comparing estimation results of key joints in the video frame $I_1$ by the estimator 1 and the estimator 2, and if a sum of all key joint coordinate errors of the two estimators is less than a set threshold ε, repeating the steps in the second stage for subsequent video frames; and if an error between the two estimators is greater than the threshold, updating, based on the estimation results of the key joints in the video frame $I_1$ by the estimator 1, the estimation results of the key joints in the video frame obtained by the estimator 2 during the operation of the estimator 1 by using the estimator 2 again, and after these results are updated, repeating the steps in the second stage for the subsequent video frames.

2. The key joint motion estimation based method for estimating continuous human postures according to claim 1, wherein the estimator 1 uses a VNect, DeepPose, Stacked Hourglass or RMPE neural network model trained by an MPI-INF-3DHP data set.

3. The key joint motion estimation based method for estimating continuous human postures according to claim 1, wherein an algorithm in the estimator 2 is an algorithm for detecting coordinate changes of the key joints by using a block matching algorithm; in the block matching algorithm, it is required to search for a block most similar to a macroblock to be matched in a previous frame based on a given matching criterion in a current frame; the macroblock is a small rectangular region centered on a selected key joint; a range of block matching is called a search window, that is a larger rectangular region centered on the selected key joint; and a macroblock having a minimum error with the macroblock to be matched in the search window serves as a matching result.

4. The key joint motion estimation based method for estimating continuous human postures according to claim 3, wherein the matching criterion in the block matching algorithm uses a minimum mean square error (MSE) function, a minimum mean absolute deviation (MAD), or a minimum sum of absolute difference (SAD) criterion,
   defined as follows:

$$MSE = \frac{1}{\sum_p p} \sum_{p \in B} |f(p+v) - f_{last}(p)|^2$$

$$MAD = \frac{1}{\sum_p p} \sum_{p \in B} |f(p+v) - f_{last}(p)|$$

$$SAD = \sum_{p \in B} |f(p+v) - f_{last}(p)|$$

wherein p represents a pixel in the macroblock to be matched B, v represents a motion vector corresponding to two macroblocks that are being matched, f(a) represents a pixel value at a position a in the current video frame, and $f_{last}$(a) represents a pixel value at a position a in the previous video frame.

5. The key joint motion estimation based method for estimating continuous human postures according to claim 4, wherein after the matching criterion is determined, it is also required to match an actual macroblock; and when the block matching algorithm selects the macroblock to be matched in the current frame, a macroblock to be selected is selectively determined by using a search template.

6. The key joint motion estimation based method for estimating continuous human postures according to claim 5, wherein when the macroblock to be selected is selectively determined by using the search template, a motion estimation search algorithm used is a three-step search method, a diamond search method, or a four-step search method.

7. The key joint motion estimation based method for estimating continuous human postures according to claim 6, wherein the three-step search method comprises the following steps:
   step one: setting a larger region in the video frame that completely contains the macroblock as the search window, wherein a center of the macroblock is a center point of the search window; with the center point as a starting point of search, searching for step lengths from a range of equal to or slightly greater than half of a radius of the search window; and in the search of each step length, calculating matching indexes of a total of nine points comprising a center point of a current square and eight points around, and selecting a point with an optimal index as a center point of a next search;
   step two: with the point obtained in the previous step as a center, reducing a currently searched step length to half of a previously searched step length, then performing a similar search, and obtaining an optimal matching point; and
   step three: continuing reducing the searched step length to half of the previous one, and performing a search to find an optimal matching position.

8. The key joint motion estimation based method for estimating continuous human postures according to claim 6, wherein the diamond search method has two different matching templates of a big diamond and a small diamond; the big diamond has nine search points, and the small diamond has only five search points; firstly, a coarse search is performed by using the big diamond search template with a larger step length, and then a fine search is performed by using the small diamond template; and the diamond search method comprises the following steps:

step one: with a diamond as a template, calculating matching indexes of a total of nine points comprising a center point and eight points around, and performing comparison to obtain a point with an optimal index;

step two: if the center point of search is the point with the optimal index, skipping to step three to use the small diamond search template, otherwise returning to the search in the step one; and step three: calculating, by using the small diamond search template with the only five search points, matching indexes of the five points, and taking a point with an optimal index as an optimal matching point.

9. The key joint motion estimation based method for estimating continuous human postures according to claim 6, wherein the four-step search method comprises the following steps:

step one: enabling an initial setting to be the same as that in the three-step search method, calculating matching indexes of nine selected points centered on a key joint, and if a point with an optimal index is a center point, skipping to step four, otherwise proceeding to step two;

step two: with a pixel searched in the previous step as the center point, keeping an interval of selected points unchanged, continuing to calculate the matching indexes of the newly obtained nine points, and if the center point is the point with the optimal index, skipping to step four, otherwise proceeding to step three;

step three: if the searched center point reaches an edge of the search window, necessarily reducing the interval of the selected points to 3×3, and proceeding to step four, otherwise repeating the step two; and step four: reducing the interval of the selected points to 3×3, and performing a search, to obtain an optimal matching point.

10. The key joint motion estimation based method for estimating continuous human postures according to claim 1, wherein during definition of human key joints, a total of 21 key joints are defined as follows:

| index | key joint |
|---|---|
| 0 | head_top |
| 1 | neck |
| 2 | right_shoulder |
| 3 | right_elbow |
| 4 | right_wrist |
| 5 | left_shoulder |
| 6 | left_elbow |
| 7 | left_wrist |
| 8 | right_hip |
| 9 | right_knee |
| 10 | right_ankle |
| 11 | left_hip |
| 12 | left_knee |
| 13 | left_ankle |
| 14 | pelvis |
| 15 | spine |
| 16 | head |
| 17 | right_hand |
| 18 | left_hand |
| 19 | right_toe |
| 20 | left_toe. |

\* \* \* \* \*